US009342330B2

(12) United States Patent
Pohlmann et al.

(10) Patent No.: US 9,342,330 B2
(45) Date of Patent: May 17, 2016

(54) DEPLOYING A USER-CONFIGURED VIRTUAL APPLIANCE TEMPLATE INCLUDING A PORTION OF AN EXISTING COMPUTING APPLICATION TO ENHANCE FUNCTIONALITY

(71) Applicant: SAP SE, Walldorf (DE)

(72) Inventors: Michael Pohlmann, Heidelberg (DE); Peter Jaeger, Heidesheim (DE); Abhik Bose, Walldorf (DE); Ronald De Vries, Walldorf (DE); Ralf Lindenlaub, Walldorf (DE); Martin Hirtle, Rheinfelden (DE); Kiril Kirov, Sofia (BG); Tim Bussiek, Belmont, CA (US)

(73) Assignee: SAP SE, Walldorf (DE)

( * ) Notice: Subject to any disclaimer, the term of this patent is extended or adjusted under 35 U.S.C. 154(b) by 178 days.

(21) Appl. No.: 13/890,966

(22) Filed: May 9, 2013

(65) Prior Publication Data

US 2013/0305244 A1 Nov. 14, 2013

Related U.S. Application Data

(60) Provisional application No. 61/645,884, filed on May 11, 2012.

(51) Int. Cl.
*G06F 9/455* (2006.01)
*G06F 9/445* (2006.01)

(52) U.S. Cl.
CPC ............ *G06F 9/455* (2013.01); *G06F 9/45558* (2013.01); *G06F 8/60* (2013.01)

(58) Field of Classification Search
None
See application file for complete search history.

(56) References Cited

U.S. PATENT DOCUMENTS

| 2004/0177352 A1* | 9/2004 | Narayanaswamy ...... G06F 8/61 717/169 |
| 2006/0005189 A1* | 1/2006 | Vega et al. ......................... 718/1 |
| 2008/0104379 A1* | 5/2008 | Peterman ............ G06F 9/44505 713/1 |
| 2009/0249279 A1 | 10/2009 | Bourdon |
| 2009/0249284 A1 | 10/2009 | Antosz et al. |
| 2009/0282404 A1* | 11/2009 | Khandekar et al. ............... 718/1 |
| 2009/0300057 A1* | 12/2009 | Friedman ...................... 707/102 |
| 2009/0313620 A1* | 12/2009 | Sedukhin et al. ................. 718/1 |
| 2009/0328030 A1* | 12/2009 | Fries ............................. 717/174 |

(Continued)

OTHER PUBLICATIONS

Oracle, Oracle VM Template Developer's Guide: Creating Pre-Built VMs for Rapid Software Deployment, Feb. 2009, An Oracle Technical White Paper.*
"European Application Serial No. 13002508.3, Extended European Search Report mailed Oct. 15, 2013", 9 pgs.

(Continued)

*Primary Examiner* — Abdullah Al Kawsar
*Assistant Examiner* — Jorge A Chu Joy-Davila
(74) *Attorney, Agent, or Firm* — Schwegman Lundberg & Woessner, P.A.

(57) ABSTRACT

Various embodiments provide mechanisms that mitigate organizational exposures when evaluating and choosing computer applications, enhancements, and modifications thereto. Some embodiments provide technological solutions that allow for rapid application prototyping, deployment, evaluation, testing, and the act of going live in a production environment. Some such embodiments provide applications including content and data, in the form of virtual appliance templates, that is pre-installed, pre-configured, pre-tested, and pre-loaded in a very rapid manner. Some embodiments may further allow for cloning of the instantiated application to another virtual computing environment, and utilization from that location on forward looking basis.

20 Claims, 4 Drawing Sheets

(56) References Cited

U.S. PATENT DOCUMENTS

| | | | | |
|---|---|---|---|---|
| 2010/0306767 | A1* | 12/2010 | Dehaan | 718/1 |
| 2010/0306772 | A1* | 12/2010 | Arnold et al. | 718/1 |
| 2010/0332617 | A1 | 12/2010 | Goodwin et al. | |
| 2011/0154331 | A1* | 6/2011 | Ciano et al. | 718/1 |
| 2011/0202916 | A1* | 8/2011 | VoBa et al. | 718/1 |
| 2011/0209144 | A1* | 8/2011 | Rowe | G06F 8/60 717/177 |
| 2012/0144236 | A1* | 6/2012 | Black et al. | 714/25 |
| 2012/0246639 | A1 | 9/2012 | Kashyap et al. | |
| 2012/0284234 | A1* | 11/2012 | Mashtizadeh et al. | 707/655 |
| 2012/0311106 | A1* | 12/2012 | Morgan | 709/220 |
| 2013/0297922 | A1 | 11/2013 | Friedman | |
| 2013/0304693 | A1 | 11/2013 | Jaeger et al. | |

OTHER PUBLICATIONS

Abele, Andrejs, "Ontology based configuration of virtual systems in a computer cloud", 4th Conference on Learning in Networks, [Online]. Retrieved from the Internet: <URL: alephfiles.rtu.lv/TUA01/00003458 56 e.pdf>, (Aug. 20, 2010), 7-15.

Hitzler, Pascal, et al., "Owl 2 Web Ontology Language Primer", WBC Webpage, [Online]. Retrieved from the Internet: w3.org/TR/2009/REC-owl2-pri mer-20091027>, (Oct. 27, 2009), 34 pgs.

"U.S. Appl. No. 13/890,954, Non Final Office Action mailed Oct. 22, 2015", 8 pgs.

"U.S. Appl. No. 13/890,954, Response filed Jan. 20. 2016 to Non Final Office Action mailed Oct. 22, 2015", 12 pgs.

* cited by examiner

DEPLOYING A USER-CONFIGURED VIRTUAL APPLIANCE TEMPLATE INCLUDING A PORTION OF AN EXISTING COMPUTING APPLICATION TO ENHANCE FUNCTIONALITY

RELATED APPLICATION

This application is related and claims benefit to U.S. Provisional Application Ser. No. 61/645,884, filed May 11, 2012 and entitled "PREASSEMBLED, RAPIDLY DEPLOYABLE SYSTEMS AND COMPONENTS", the entirety of which is incorporated herein by reference.

BACKGROUND INFORMATION

Many software systems that are implemented or can be implemented within organizations, such as Enterprise Resource Planning (ERP), Customer Relationship Management (CRM), Accounting, and other such systems and add-on modules or components thereof, are notoriously difficult and expensive to implement, configure, augment, and modify. As a result, the organizational exposure in choosing to implement such systems can be quite high. Thus, for these and other reasons, organizations are often reluctant in deciding to implement or modify these systems.

DETAILED DESCRIPTION

Various embodiment as illustrated and described herein provide mechanisms that mitigate and even eliminate organizational exposures when evaluating and choosing computer applications, enhancements, and modifications thereto. Some embodiments provide technological solutions that allow for rapid application prototyping, deployment, evaluation, testing, and the act of going live in a production environment. Some such embodiments provide applications including content and data, in the form of a virtual appliance, templates that are pre-installed, pre-configured, pre-tested, and pre-loaded in a very rapid manner. For example, some embodiments provide a check box or questionnaire style tool through which a user can provide input as to the requirements and specifications for how a particular application is to be implemented and utilized. Based on that input, an appropriate virtual appliance template is selected and instantiated in a virtual computing environment as specified in the input or a location by default. The instantiated application may then be quickly tested and access may be provided to the customer. Some embodiments may further allow for cloning of the instantiated application to another virtual computing environment, and utilization from that location on a forward-looking basis. These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit, Thus, the exemplary process flow is applicable to software, firmware, and hardware implementations.

Figure 1:
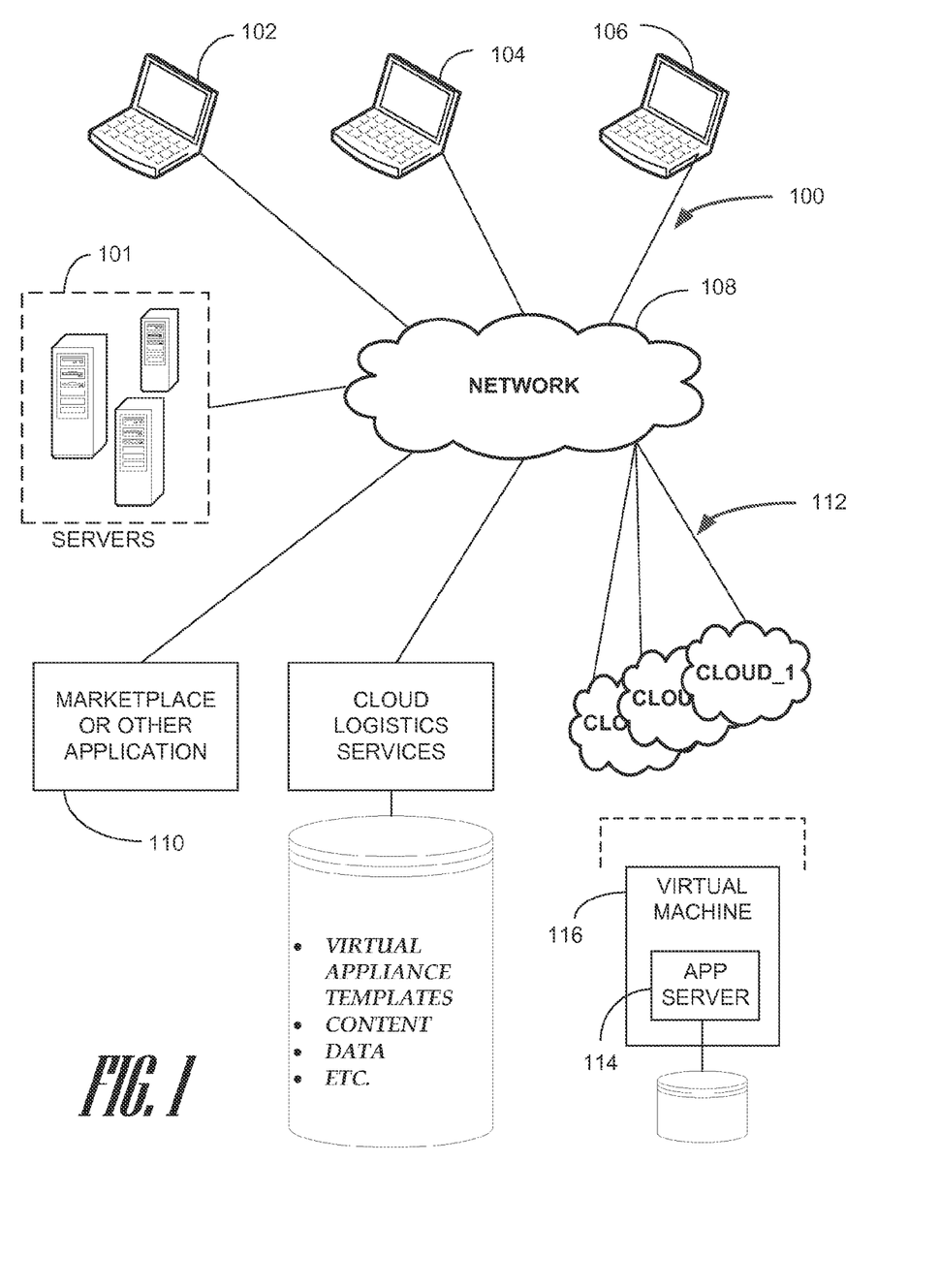
FIG. 1 is a logical block diagram of a networked computing environment according to an example embodiment.

FIG. 1 is a logical block diagram of a networked computing environment 100 according to an example embodiment. The networked computing environment 100 includes an enterprise computing environment 101 coupled to a network 108, The enterprise computing environment 101 is a computing environment within which enterprise computer systems operate. The enterprise computer systems may include ERP, accounting, CRM, and other computing applications that support an enterprise and are accessible by client computing devices 102, 104, 106 via the network 108. The network 108 may include one or more of a local area network (LAN), a wide area network, the Internet, and other network types. Although only three client computing devices are illustrated, any number of client computing devices may be present in various embodiments.

In some embodiments, the networked computing environment 100 also includes cloud computing environments 112. Each cloud computing environment is a network resource accessible via the network 108. The cloud computing devices generally provide one or both of computing and storage capacity via the network 108 as services. A cloud computing environment typically includes a virtualized environment that is logically distinct from other computing environments that may execute on the same hardware, but are each individually accessible. Thus, one cloud computing environment may include a hardware set, such as one or more server computers having one or more virtual machines 116 that each provide a computing environment within which computer applications may execute. In some embodiments, an application server 114 or other process within which data and service requests may be received via the network 108 and serviced execute within a virtual machine computing environment. A cloud computing environment may also include a database or other data storage application or arrangement logically located therein. In some embodiments, the enterprise computing environment 101 may be a cloud computing environment within which the enterprise applications execute and are accessed by the client computing devices 102, 104, 106.

Some embodiments include a marketplace 110 network location accessible via the network 108. The marketplace 110 is a network resource that provides enterprise computing application customers, including actual and prospective customers, access to computer application resources. Such computer application resources may include entire applications, add-on or enhancement functionality, additional content, and other options with regard to computing applications. Such computing applications are typically enterprise computing applications, such as ERP, CRM, accounting, and other similar computing applications utilized by organizations. These computing applications may be deployed within the enterprise computing environment 101, within one or more of the cloud computing environments 112, or elsewhere. Thus, when a user associated with an organization visits the marketplace 110, the user typically desires to learn about available software applications, add-on or enhancement functionally, additional content, and other options with regard to such computing applications the organization has deployed or is considering deploying.

The marketplace 110 may be one or more of a website, an app that executes on a computing device or within a computer program such as a web browser, or other accessible content or applications that marketplace visitors may utilize. In a typically embodiment, the marketplace 110 is a website that delivers information with regard to available computing applications, add-on or enhancement functionality, additional content, and other options with regard to computing applications and is accessed via the network 108 utilizing a client computing device 102, 104, 106. The marketplace 110 may provide marketing content in various forms to generate marketplace 110 visitor interest or knowledge in one or more offerings via the marketplace 110.

When a visitor is interested, the visitor may visit a portion of the marketplace 110 to obtain a cloud-hosted demonstration application or add-on to an existing application or to select additional content or functionality enhancements for a computing application of an organization. For example, the visitor may be with an organization that already has deployed an ERP application and the visitor desires to obtain a demonstration of a Human Resources Management module add-on to the ERP application. In another example, a visitor does not yet have a computing application offered via the marketplace 110 and provides input requesting a demonstration instance of an entire ERP application. In yet another embodiment, a visitor may have a computing application and select an add-on or enhancement of the application for deployment thereof right away for productive use. In all of these examples, the marketplace 110 provides options for items available via the marketplace 110 and the visitor is provided assistance in choosing and deploying the proper item to a suitable location.

In some embodiments, the marketplace 110 provides selectable listings of at least one product offering. The selectable listing may be provided as a set of "check boxes," as a wizard-like process guiding the visitor through a set of options, and other listing types as may be relevant based on the context of the offerings and possible configuration and deployment options thereof. In particular, each of the items offered via the marketplace, in some embodiments, may be in the form of virtual appliance templates. Each item offered may exist in the form of multiple virtual appliance templates and the options presented to the marketplace 110 visitor enable selection and deployment of a virtual appliance template configured to meet the requirements and needs of the visitor's organization.

A virtual appliance template may exist for an entire computing application (e.g., an ERP, CRM, FIRM applications), add-ons or enhancements to an application (e.g., business intelligence module, mobile module, language or other application localization module or content, warehouse management, logistics processes), content (e.g., key performance indicators, promotional campaign definitions, compliance requirements, workflow processes), data (e.g., contact lists), and the like. Virtual appliance templates are generally pre-assembled, pre-configured, and pre-tested for their respective purposes. As such, virtual appliance templates are appliance-like in that they can essentially be "plugged-in" and they function for their intended purpose.

As a result, demonstration systems and modules can be quickly provided to prospective customers for entirely new systems and to enhance or expand existing systems. For purposes of demonstration systems, virtual appliance templates may include sample or demonstration data. In some embodiments, a visitor may also have options to upload data for a demonstration system or for data to be copied from an existing system to the demonstration system. A rapidly deployed demonstration system quickly provides an organization the ability to try a system or module and evaluate whether the system or module meets their needs and expectations.

The options provided via the selectable listing, wizard, and the like are related to different functionality and deployment options of the item selected by a visitor. The options also typically include deployment destination options, such as deploying a selected item in a cloud and which cloud (e.g., a cloud of the visitor's organization, a cloud of a software provider or marketplace 110 host, a third-party hosted cloud contracted by the visitor's organization, or other cloud). Other deployment destination options may also be provided, such as a deployment to an application instance of the visitor's organization or integrated therewith. The visitor may also provide connectivity information (i.e., network location identify data such as a network address and security credential data) to allow deployment processes triggered through the marketplace to deploy code, content, and data to a specified destination. Such options, in particular the option to specify a deployment destination of a software provider or marketplace host 110 cloud allows the particular virtual appliance template to be deployed without requiring an organization to utilize existing hardware or procure and maintain additional hardware upon which the virtual appliance template will execute.

Through the querying of the marketplace 110 visitor for requirement and deployment information and the ability to deploy pre-assembled, pre-configured, and pre-tested virtual appliance templates to a cloud or other location, organizational exposure in choosing to implement, modify, configure, and maintain complex software systems is significantly mitigated.

Various embodiments include not only the ability to implement pre-assembled software functionality and content through virtual appliance templates as already discussed, but also the ability to move virtual appliance template instances via cloud logistic services. Cloud logistic services provide various abilities such as the ability to deploy virtual appliance templates to a cloud, move or clone a deployed virtual appliance template from one cloud to another, perform automated testing of deployed virtual appliance templates, and the like.

Such services may include translating a virtual appliance template from one form that is tailored to execute within one virtual machine-type environment of a particular cloud to a virtual machine-type environment of another particular cloud. For example, a translation from a form tailored to a VMware® virtual machine to a form tailored to an Amazon® hosted cloud.

The deployment options and the cloud logistic services may also provide options to transport virtual appliance templates and instantiated instances of virtual appliance templates between clouds via non-networked mechanisms. Such embodiments may utilize USB hard disks, memory sticks, optical disks, and other data storage devices. The data to be transported and executable code of a cloud logistic service may be loaded on to the particular data storage device and then coupled to a device capable of loading the data from the data storage device to the target cloud.

The cloud logistics services may be provided via a computing device or computing environment through which the marketplace 110 is also provided. However, the cloud logistics services may be provided via one or more other computing devices coupled to the network 108. The cloud logistics services typically have access to the virtual appliance templates that may be stored in a database, on one or more data storage devices, or other storage mechanism. In some embodiments, when the marketplace 110 receives input from a visitor and further input to instantiate a virtual appliance instance, the marketplace 110 communicates commands and data based on received visitor input to the cloud logistics services. The cloud logistics services then determine which virtual appliance template or templates to deploy and deploys them according to the received input. The deployed virtual appliance template(s) may then be configured according to the received visitor input, if such configuration is necessary. Any needed integration with other application instances or data copying therefrom may also be performed. Once these tasks and any other tasks as needed according to the context of the virtual appliance template(s) are completed, such as automated testing, the visitor and other users within the user's organization may be provided access to the deployed virtual appliance template.

In some instances, an evaluation instance of an application or an application add-on or enhancement may be instantiated in a demonstration cloud for evaluation by a customer. The customer then utilizes the evaluation instance to try out the instance and ensure it meets their needs and requirements. As the customer gains confidence, the evaluation instance may then be converted to a prototype instance by providing additional input as to requirements, customer data, integration with another computer system, and the like. In some embodiments, the prototype instance may then be cloned to a development or testing cloud environment. Customer-specific development or enhancements may be made here, if needed. At any point, when the customer decides a particular instance is ready to go-live, the instance that is ready may be cloned to a production environment and tested to ensure the cloning process was successful and that the cloud environment is properly configured and operational. The production instance may then go live. As the underlying implemented virtual appliance template(s) are pre-assembled, pre-configured, and pre-tested for their respective purposes, this process can move very quickly and with minimized risk. Further, the initial financial outlays of the customer are minimized because the customer is not required to purchase and maintain hardware at any point, although the customer does have the option to utilize their own cloud environment for deployment. Additionally, as most of these processes are automated, including the selection of the virtual appliance template(s), deployment, testing, and cloning, the human effort needed is minimized, and therefore the cost associated therewith is also minimized.

Figure 2:
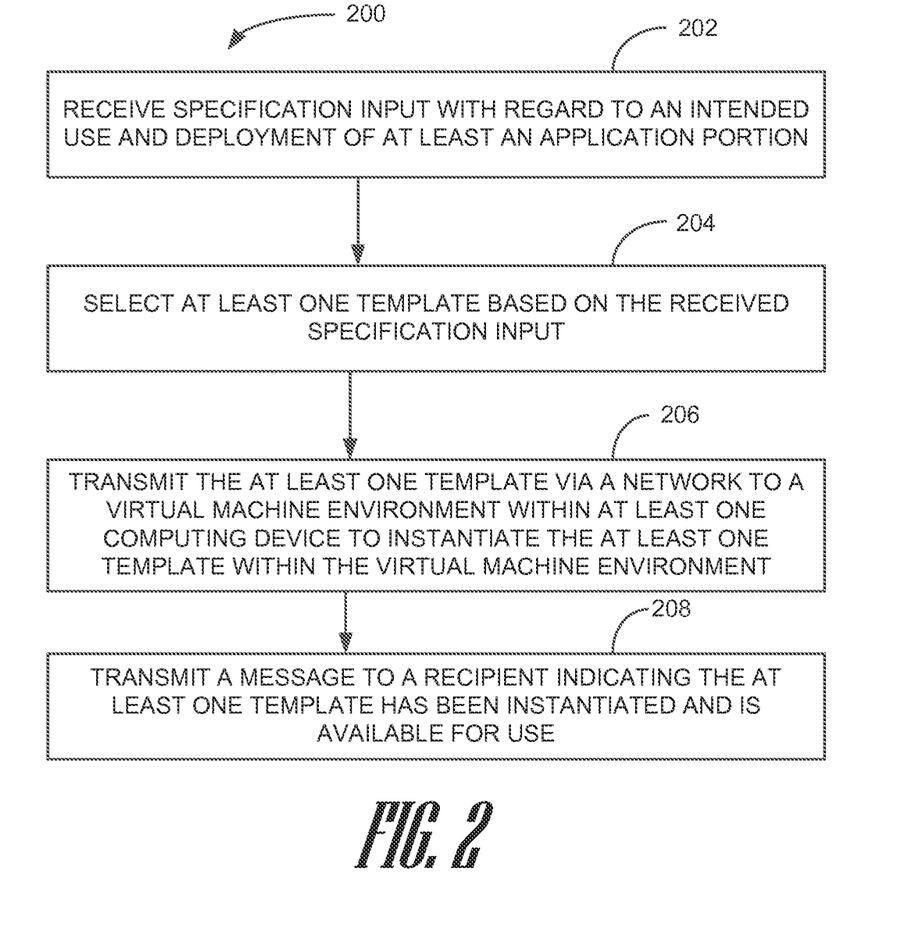
FIG. 2 is a block flow diagram of a method, according to an example embodiment.

FIG. 2 is a block flow diagram of a method 200, according to an example embodiment. The method 200 is an example of a method that may be performed to cause a virtual appliance template to be instantiated. The method 200 includes receiving 202 specification input with regard to an intended use and deployment of at least an application portion as may be represented and instantiated from a virtual appliance template. The method 200 further includes selecting 204 at least one template based on the received specification input. Further, the method 200 includes transmitting 206 the at least one template via a network to a virtual machine environment within at least one computing device to instantiate the at least one template within the virtual machine environment. In some embodiments, once the at least one template has been instantiated, the method 200 includes transmitting 208 a message to a recipient indicating the at least one template has been instantiated and is available for use. Prior to transmitting 208 the message, some embodiments include executing at least one automated testing process to test the instantiated at least one template within the virtual machine environment. The automated testing process may include identifying one or more automated test cases to execute based on an association with the implemented at least one template.

In some embodiments, the at least one template, such as a virtual appliance template, includes code executable within the virtual computing environment and configuration settings that configures how the code executes within the virtual computing environment.

Figure 3:
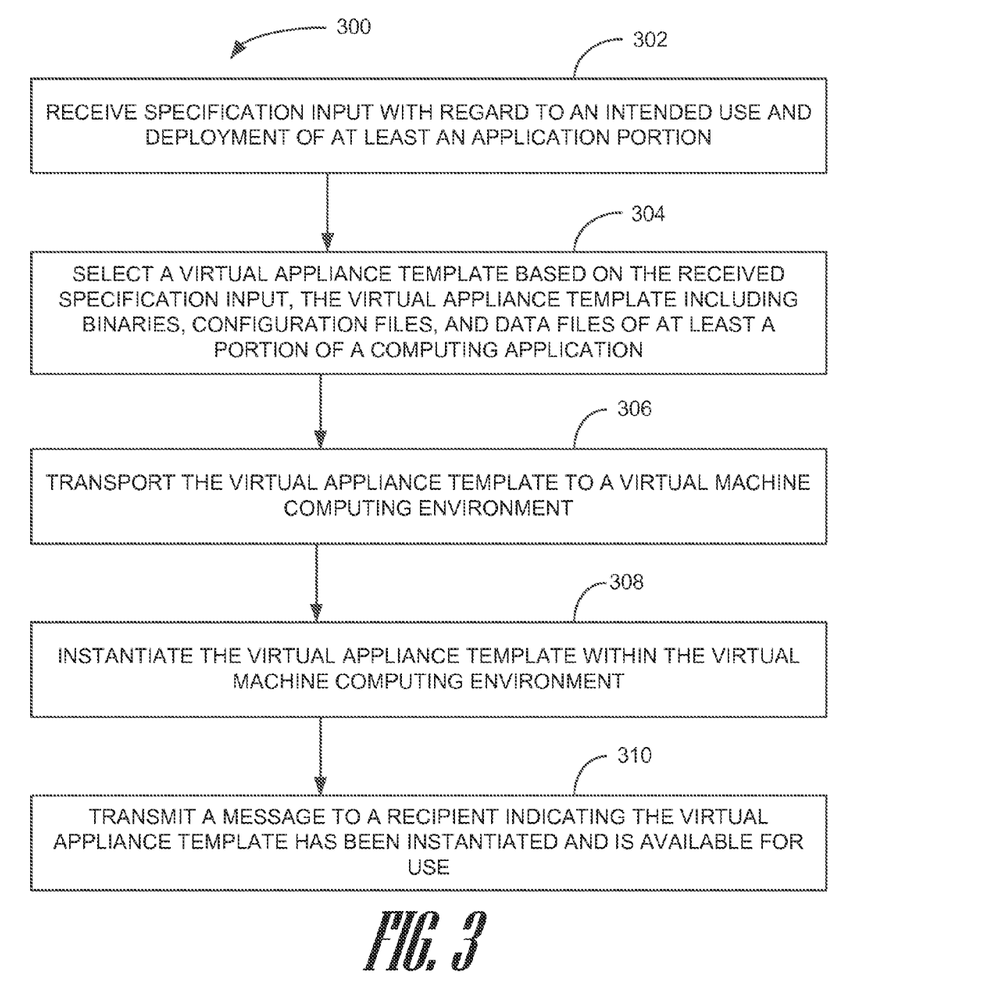
FIG. 3 is a block flow diagram of a method, according to an example embodiment.

FIG. 3 is a block flow diagram of a method 300, according to an example embodiment. The method 300 is another example of a method that may be performed to instantiate a virtual appliance template. The method 300 includes receiving 302 specification input with regard to an intended use and deployment of at least an application portion and, based thereon, selecting 304 a virtual appliance template. In such embodiments, the virtual appliance template typically includes binaries, configuration files, and data files of at least a portion of a computing application.

The method 300 further includes transporting 306 the virtual appliance template to a virtual machine computing environment and instantiating 308 the virtual appliance template within the virtual machine computing environment. In some such embodiments, the virtual machine computing environment includes an agent in the form of a program or process that executes or is callable therein. Thus, the agent may be called to trigger the instantiating 308 of the virtual appliance template within the virtual environment. The call of the agent may be an application programming interface (API), web services call, or other call that may be made through transmission of messages via a network or between systems.

In some embodiments, the method 300 further includes transmitting 310 a message to a recipient indicating the virtual appliance template has been instantiated and is available for use. The message may be transmitted 310 from a marketplace, such as a marketplace network location 110, to an account of a user from whom the specification input was received 302. In other embodiments, the message may be transmitted 310 by an agent that executes within the virtual machine computing environment in which the virtual appliance template has been instantiated.

In some embodiments of the method 300, transporting 306 the virtual appliance template to the virtual machine computing environment includes writing the virtual appliance template and a script to a detachable data storage device. In other embodiments of the method 300, the transporting 306 includes transmitting the virtual appliance template and the script via a network, such as the Internet, to the virtual machine computing environment. In such embodiments, the script is executable within the virtual machine computing environment to perform the instantiating 308 of the virtual appliance template within the virtual machine computing environment. The script, in some embodiments, may be a part of the selected 304 virtual appliance template. In other embodiments, the script may be generated by a process on demand.

In some embodiments, the selected 304 virtual appliance template includes code executable within the virtual computing environment to establish a structure within the virtual computing environment within which the binaries, configuration files, and data files included in the virtual appliance template will be written. The included code in such embodiments is then further executable to write the binaries, configuration files, and data files to appropriate locations within that structure.

The method 300, in some embodiments, upon instantiating 308 the virtual appliance template, may include testing the instance of the virtual appliance template to verify successful instantiating 308 and operability. This testing may include executing an automated testing process to test the instantiated 308 virtual appliance template.

At some point, after the instantiated 308 instance of the virtual appliance template has been utilized, tested, configured, or modified, such as within a testing environment, the virtual appliance template may be moved or copied to another virtual computing environment. Some such embodiments include receiving command input to clone the instantiated at least one template to another virtual machine environment. The command input may be received within a hosted marketplace, such as the marketplace 110. However, the command input may be received within a utility application, a command line interface, or other application, utility, or interface of the virtual computing environment or the instantiated virtual appliance template.

In response to the received command input, such embodiments include copying the instantiated at least one template from the virtual machine environment to the another virtual machine environment. In some such embodiments, copying the instantiated at least one template from the virtual machine environment to the another virtual machine environment includes reading a structure within which binaries, configuration files, and data of the at least one template are stored in the virtual machine environment. Such embodiments further include writing, to a data storage device, a representation of the structure within which binaries, configuration files, and data of the at least one template are stored and then copying, to the data storage device, the binaries, configuration files, and data of the at least one template from the virtual machine environment to a storage location. Next, such embodiments include transporting the representation of the structure and the copied binaries, configuration files, and data of the at least one template to the another virtual machine environment. A cloned instance of the at least one template may then be established within the another virtual machine environment based on the transported representation of the structure and the copied binaries, configuration files, and data of the at least one template.

Figure 4:
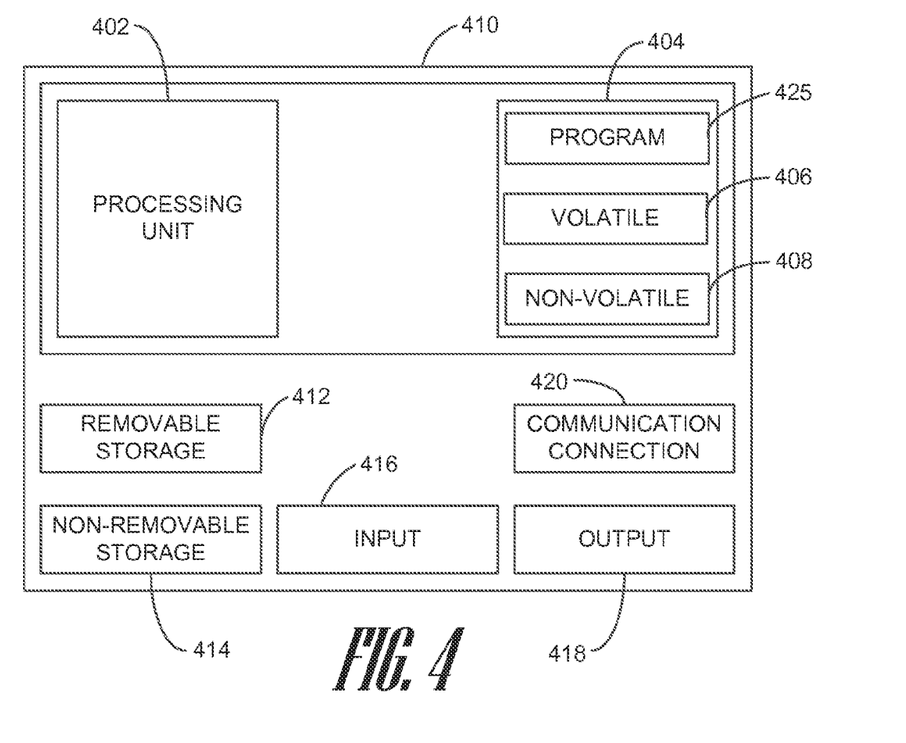
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 108, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium. For example, a computer program 425 capable of performing one or more of the methods discussed herein.

Another system embodiment includes at least one processor and a network interface device. The system in such embodiments typically includes a number of modules. For example, the modules include a user interaction module executable by the at least one processor to transmit, via the network interface device, user interface data defining at least one user interface requesting specification input with regard to an intended use and deployment of at least an application portion. The modules also include a selection module executable by the at least one processor to select a virtual appliance template based on specification input with regard to an intended use and deployment of at least an application portion, the specification input received via the network interface device from a user interface provided by the user interaction module, the selected virtual appliance template including binaries, configuration files, and data files of at least a portion of a computing application. The modules also include a transport module executable by the at least one processor to perform at least one data transport action with regard to the selected virtual appliance template based on the received specification input.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, at a network interface device, specification input from a user for an intended use and deployment of a portion of an existing computing application in a virtual machine computing environment, to add-on to or enhance functionality of the existing computing application, wherein the input from the user identifies the virtual machine computing environment;
   selecting, by the network interface device, a virtual appliance template for the portion of the existing computing application based on the received specification input from the user, the virtual appliance template including binaries, configuration files, and data files of the portion of the existing computing application;
   transporting, by the network interface device, the virtual appliance template for the portion of the existing computing application and a script to an agent, of the virtual machine computing environment that was identified based on input from the user;
   wherein the script is executed by the agent to instantiate the virtual appliance template for the portion of the existing computing application within the virtual machine computing environment; and
   transmitting, by the network interface device, a message to a recipient indicating the virtual appliance template for the portion of the existing computing application has been instantiated and is available for use.

2. The method of claim 1, wherein transporting the virtual appliance template to the virtual machine computing environment includes:
   writing the virtual appliance template and the script to a detachable data storage device.

3. The method of claim 1, wherein the virtual appliance template includes code executable within the virtual machine computing environment to:
   establish a structure within the virtual machine computing environment within which the binaries, configuration files, and data files will be written; and
   write the binaries, configuration files, and data files to the structure established within the virtual computing environment.

4. The method of claim 1, further comprising:
   executing an automated testing process to test the instantiated virtual appliance template within the virtual machine environment.

5. The method of claim 1, wherein the virtual machine computing environment is a first virtual machine computing environment, the method further comprising:
   receiving, at the network interface device, command input to clone the instantiated virtual appliance template to a second virtual machine computing environment; and
   copying the instantiated virtual appliance template from the first virtual machine computing environment to the second virtual machine computing environment.

6. The method of claim 1 wherein the add-on or enhancement functionality includes additional content or data.

7. The method of claim 6 wherein additional content includes at least one of key performance indicators, promotional campaign definitions, compliance requirements and workflow processes, and wherein data includes at least one of contact lists, and sample or demonstration data.

8. The method of claim 1 wherein an add-on or enhancement functionality includes at least one of a business intelligence module, mobile module, language module or content, application localization module or content, warehouse management, and logistics processes.

9. The method of claim 1 wherein the specification input is received from a user of the computing application and wherein the recipient of the message is the user of the computing application.

10. The method of claim 1 wherein the virtual appliance template includes sample or demonstration data and wherein the virtual machine computing environment is a demonstration system.

11. A non-transitory computer-readable medium, with instructions stored thereon, which when executed, cause a computer to perform operations comprising:
    receiving specification input from a user for an intended use and deployment of a portion of an existing computing application in a virtual machine computing environment, to add-on to or enhance functionality of the existing computing application, wherein the input from the user identifies the virtual machine computing environment;
    selecting a virtual appliance template for the portion of the existing computing application based on the received specification input from the user, the virtual appliance template including binaries, configuration files, and data files of the portion of the existing computing application;
    transporting the virtual appliance template for the portion of the existing computing application and a script to an agent, of the virtual machine computing environment that was identified based on input from the user;
    wherein the script is executed by the agent to instantiate the virtual appliance template for the portion of the existing computing application within the virtual machine computing environment; and
    transmitting a message to a recipient indicating the virtual appliance template for the portion of the existing computing application has been instantiated and is available for use.

12. The non-transitory computer-readable medium of claim 11, wherein the script is further executable by the agent program, based at least in part on data included in the virtual appliance template, to:
    establish a structure within the virtual computing environment for writing the binaries, configuration files, and data files; and
    write the binaries, configuration files, and data files to the structure established within the virtual computing environment.

13. The non-transitory computer-readable medium of claim 11, wherein the instructions are further executable to perform operations comprising:
    calling at least one automated testing process that is executable to test the instantiated virtual appliance template within the virtual machine computing environment.

14. The non-transitory computer-readable medium of claim 11, wherein the virtual machine computing environment is a first virtual machine computing environment, and wherein the instructions are further executable to perform operations comprising:
    receiving command input to clone the instantiated virtual appliance template to a second virtual machine computing environment; and
    copying the instantiated virtual appliance template from the virtual machine environment to the second virtual machine computing environment.

15. The non-transitory computer-readable medium of claim 11, wherein the message to the recipient is a second message, and wherein the instructions further cause the computer to perform operations comprising:

receiving a first message from the agent of the virtual machine computing environment indicating the virtual appliance template for the portion of the existing computing application has been instantiated, before transmitting the second message to the recipient.

16. A system comprising:

at least one processor and a network interface device;

a user interaction module executable by the at least one processor to transmit, via the network interface device, user interface data defining at least one user interface requesting specification input from a user for an intended use and deployment of a portion of an existing computing application in a virtual machine computing environment, to add-on to or enhance functionality of the existing computing application, wherein the input from the user identifies the virtual machine computing environment;

a selection module executable by the at least one processor to select a virtual appliance template for the portion of the existing computing application based on specification input from the user for an intended use and deployment of the portion of the existing computing application, the specification input received via the network interface device from a user interface provided by the user interaction module, the selected virtual appliance template including binaries, configuration files, and data files of the portion of the existing computing application; and a transport module executable by the at least one processor to perform at least one data transport action with regard to the selected virtual appliance template for the portion of the existing computing application based on the received specification input, wherein the at least one data transport action includes transmitting the selected virtual appliance template and a script to an agent, of the virtual machine computing environment that was identified based on input from the user, and wherein the script is executable by the agent to instantiate the virtual appliance template for the portion of the existing computing application within the virtual machine computing environment, and wherein a message is transmitted to a recipient indicating the virtual appliance template for the portion of the existing computing application has been instantiated and is available for use.

17. The system of claim 16, further comprising:

a data storage device storing a virtual appliance template repository; and wherein the selection module is executable to select the virtual appliance template from the virtual appliance template repository.

18. The system of claim 16, wherein the specification input includes data identifying desired functionality, configuration information, and deployment information, the selection module utilizing the data identifying desired functionality and configuration information to select the selected virtual appliance template and the transport module utilizing the deployment information to determine how to transport the selected virtual appliance template and a location to which the selected virtual appliance template is to be transported.

19. The system of claim 16, wherein the virtual appliance template includes or is augmented, by the transport module, to include the script executable to instantiate the virtual appliance template within a virtual computing environment.

20. The system of claim 19, wherein the script is further executable, based at least in part on data included in the virtual appliance template, to:

establish a structure within the virtual computing environment within which the binaries, configuration files, and data files will be written; and write the binaries, configuration files, and data files to the structure established within the virtual computing environment.

* * * * *